United States Patent
Olang et al.

(10) Patent No.: US 11,148,970 B2
(45) Date of Patent: Oct. 19, 2021

(54) HIGHLY HYDROLYTICALLY STABLE LOOSE-FILL INSULATION

(71) Applicant: Owens Corning Intellectual Capital, LLC, Toledo, OH (US)

(72) Inventors: Fatemeh Nassreen Olang, Granville, OH (US); William E. Downey, Granville, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 142 days.

(21) Appl. No.: 15/182,933

(22) Filed: Jun. 15, 2016

(65) Prior Publication Data

US 2016/0368816 A1    Dec. 22, 2016

Related U.S. Application Data

(60) Provisional application No. 62/180,389, filed on Jun. 16, 2015.

(51) Int. Cl.
| C03C 25/40 | (2006.01) |
| C03C 17/30 | (2006.01) |
| E04B 1/76  | (2006.01) |

(52) U.S. Cl.
CPC .................. *C03C 25/40* (2013.01)

(58) Field of Classification Search
CPC   C03C 13/00; C03C 13/06; C03C 1/02; C03C 1/024; C03C 17/28; C03C 17/30; C03C 25/40; E04B 1/78; E04B 1/7658
USPC ........................................................ 252/62
See application file for complete search history.

(56) References Cited

U.S. PATENT DOCUMENTS

| 3,498,872 | A | * | 3/1970 | Marsden | C03C 25/40 523/215 |
| 3,813,351 | A |   | 5/1974 | Thomson | |
| 3,862,079 | A |   | 1/1975 | Plueddemann | |
| 4,889,747 | A |   | 12/1989 | Wilson | |
| 4,969,711 | A |   | 11/1990 | Rogler et al. | |
| 5,102,967 | A | * | 4/1992 | Meder | C09D 4/00 528/10 |
| 5,112,393 | A |   | 5/1992 | Engel et al. | |
| 6,562,257 | B1 | * | 5/2003 | Chen | C03C 25/40 252/183.13 |
| 6,890,650 | B2 |   | 5/2005 | Hedden | |
| 6,933,349 | B2 |   | 8/2005 | Chen et al. | |
| 7,157,524 | B2 |   | 1/2007 | Chen et al. | |
| 7,205,259 | B2 |   | 4/2007 | Soerens | |
| 2004/0106721 | A1 | * | 6/2004 | Soerens | A61L 15/60 524/445 |
| 2009/0227706 | A1 | * | 9/2009 | Hansen | C03C 25/34 523/205 |
| 2011/0223364 | A1 | * | 9/2011 | Hawkins | C03C 25/1095 428/34.5 |
| 2014/0026517 | A1 |   | 1/2014 | Houpt et al. | |

FOREIGN PATENT DOCUMENTS

WO    8807536 A1    10/1988

OTHER PUBLICATIONS

International Search Report and Written Opinion from PCT/US16/37532 dated Sep. 13, 2016.
Office Action from CN Application No. 201680042212.3 dated Jul. 1, 2019.
Extended European Search Report from EP Application No. 16812293.5 dated Feb. 5, 2019.
Office Action from AU Application No. 2016280022 dated Dec. 6, 2019.

* cited by examiner

*Primary Examiner* — Matthew E. Hoban
*Assistant Examiner* — Lynne Edmondson
(74) *Attorney, Agent, or Firm* — Calfee, Halter & Griswold LLP

(57) ABSTRACT

The general inventive concepts relate to unbonded loose-fill fiberglass compositions useful for insulation. The compositions demonstrate high hydrolytic stability. In certain instances, this is accomplished by application of a surface modifier. In certain embodiments, the modifying agent is prepared by dilution and hydrolysis of a silane at a high solid content (i.e., hydrolysis at 25% to 60% solid).

15 Claims, No Drawings

HIGHLY HYDROLYTICALLY STABLE LOOSE-FILL INSULATION

RELATED APPLICATIONS

This application claims priority to U.S. provisional application Ser. No. 62/180,389, filed Jun. 16, 2015, titled "HIGHLY HYDROLYTICALLY STABLE LOOSE-FILL INSULATION" which is incorporated herein by reference in its entirety.

TECHNICAL FIELD

The present disclosure relates to a pourable or blowable loose-fill insulation for sidewall and attic installation, and in particular to a loose-fill insulation comprising glass fibers.

BACKGROUND

Fiberglass is used in a variety of thermal insulation applications including, for example, in building insulation, pipe insulation, and in molded automobile parts (e.g., hood liners), as well as in a variety of acoustical insulation applications including, for example, in molded automobile parts (e.g., dashboard liners) and office furniture/panel parts.

Certain fiberglass insulation products include glass fibers that are bound or held together by a binder. During production of such products, streams of molten glass are drawn into fibers of varying lengths and then blown into a forming chamber where they are deposited with little organization, or in varying patterns, as a mat onto a traveling conveyor. The fibers, while in transit in the forming chamber and while still hot from the drawing operation, are sprayed with an aqueous binder solution. The residual heat from the glass fibers and the flow of cooling air through the fibrous mat during the forming operation generally evaporates most of the water from the binder and causes the binder to penetrate the entire thickness of the mat. Subsequently, the coated fibrous mat is transferred out of the forming chamber to a transfer zone where the mat vertically expands due to the resiliency of the glass fibers. The coated mat is then transferred to a curing oven, where heated air is blown through the mat, or to a curing mold, where heat may be applied under pressure, to cure the binder and rigidly attach the glass fibers together for use in various types of cured fiberglass insulation products (e.g., building insulation, molded automobile hood liners, and office furniture/panel parts).

Other types of fiberglass insulation products include glass fibers that are not bound or held together by a binder. During production of such products, streams of molten glass are drawn into fibers of varying lengths and then blown into a forming chamber where they are deposited with little organization, or in varying patterns, as a mat onto a traveling conveyor or into a duct for transport. Subsequently, the fibrous mat is transferred out of the forming chamber to a transfer zone where the fibers may expand due to the resiliency. The expanded glass fibers are then sent through a mill, e.g., a hammermill, to be cut apart, after which treatment various types of fluids, including oil, silicone, and/or anti-static compounds, may be applied. The resulting glass fibers, commonly known as "loose-fill" fiberglass, are collected and compressed into a bag for use in various types of application specially for hard to access applications (e.g., attic insulation).

In many instances, the loose-fill insulation is installed by opening the package and adding the loose-fill to the hopper of a pneumatic blower which blows the loose fill insulation into the desired area. Loose-fill insulation is popular because it can be easily and quickly applied in both new as well as in existing structures. Moreover, loose-fill insulation is a relatively low cost material and has the added advantage that it can insulate irregular or hard-to-reach spaces.

Different chemicals are applied on loosefill installation to improve the physical properties of the ULF. Surface modifiers are used to protect the glass fiber and improve weathering of the product, specifically from humidity (also known as hydrolytic stability).

SUMMARY

The general inventive concepts relate to an unbonded loose-fill fiberglass (ULF) material demonstrating high insulative properties regardless of the humidity of the environment throughout the process of making and installing the product. In the absence of a binder, a silane acts as a surface modifier by chemically interacting with the glass fiber surface thereby reducing the chemical interactions of the glass fibers with, for example, water. The surface modifying agent according to the general inventive concepts include any agents which chemically interact with the glass fiber surface by: 1) bonding resulting from an attracting force, such as hydrogen bonding or Van der Waals bonding or 2) chemical bonding, which is typically covalent bonding. The protecting agents are preferably applied to glass fibers before they are compacted for shipping.

The general inventive concepts may comprise one or more of the following features and/or combinations thereof. A fiberglass material contains glass fibers having a modifying agent evenly distributed thereon. The modifying agent acts as a hydrophobic barrier, preventing chemical interaction between water and the surface of the glass fiber. The fiberglass material may have any suitable modifying agent content, for example, about 0.15 wt % to about 0.05 wt based on the dry weight of the glass fibers, or about 0.10 wt % to about 0.075 wt %. The fiberglass material is particularly suitable for use in thermal insulation applications.

In a specific example, the fiberglass material is used as a loose-fill fiberglass insulation. The fiberglass insulation includes loose-fill fiberglass and a modifying agent distributed throughout the fiberglass. The surface modifying agent content of the loose-fill fiberglass is sufficient for the fiberglass insulation to have a high insulative lifespan and low hydrolysis due to ambient water, even in high humidity environments.

In an exemplary embodiment, a method for producing a fiberglass material with high hydrolytic stability is provided. The method generally involves mixing a modifying agent with glass fibers so that the modifying agent is evenly distributed on the glass fibers. The modifying agent may be prepared by hydrolysis of a silane coupling agent to change the alkoxy groups to hydroxyl groups which are capable of reacting with the silanol groups on the glass surface. In certain embodiments, the modifying agent is prepared by hydrolysis of a silane modifying agent at a high solid content (i.e., 10% to 60% solid). The hydrolyzed silane modifying agent is then applied to the glass fiber.

In an exemplary embodiment, pourable or blowable loose-fill insulation product is described. The loose-fill insulation product comprising: glass fiber insulation wool, said glass fiber insulation wool comprising a plurality of glass fibers each having hydroxyl groups on the surface thereof; a silane modifying agent chemically interacting with said hydroxyl groups which promotes hydrolytic resistance in said glass fiber insulation wool; and wherein said modifying agent comprises less than 25% monomeric units.

In an exemplary embodiment, pourable or blowable loose-fill insulation product is described. The loose-fill insulation product comprising: glass fiber insulation wool, said glass fiber insulation wool comprising a plurality of glass fibers each having hydroxyl groups on the surface thereof; a silane modifying agent chemically interacting with said hydroxyl groups which promotes hydrolytic resistance in said glass fiber insulation wool; and wherein said modifying agent is prepared by hydrolysis of the silane modifying agent at a high solid content (i.e., 10% to 60% solid).

In an exemplary embodiment, a method for the production of an unbonded loose-fill insulation is described. The method comprising diluting a silane modifying agent; hydrolyzing the silane modifying agent to provide a hydrolyzed silane modifying agent; and mixing the hydrolyzed modifying agent with glass fibers so that the modifying agent is distributed on the glass fibers.

Other aspects and features of the general inventive concepts will become more readily apparent to those of ordinary skill in the art upon review of the following description of various exemplary embodiments in conjunction with the accompanying figures.

DETAILED DESCRIPTION

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

As used herein, unless otherwise indicated, the terms "surface modifier," "modifying agent," and "silane modifying agent" are used interchangeably and refer to a chemical agent applied to the surface of a glass fiber in the absence of a binder, whether in hydrolyzed or prehydrolyzed from. The modifier is provide generally to protect the surface of the glass from unwanted chemical interaction.

As used herein, unless otherwise indicated, the term "hydrolyzed at a solid level," when referring to a modifying agent, refers to dilution of a silane reagent, reaction of alkoxy silanes with water, and chemical hydrolysis of some or all of the alkoxy groups.

As used herein, unless otherwise indicated, the term "hydrolytic resistance" refers to a relative reduction of chemical interactions between water and a glass fiber when compared to an unmodified glass fiber.

The thermal conductivity of a material is defined as the heat flux density divided by the temperature gradient that causes the heat flow. Heat flow in fiber insulation takes place by conduction through the fibers and through the enclosed air and by radiation transfer among the fibers. Heat transfer by convection is eliminated in light density glass fiber insulation.

Hydrolytic stability may be promoted by the addition of surface modifiers to reduce the glass/water interactions. A variety of chemicals are applied to the glass fibers during production of ULF insulation in order to achieve desired properties such as lubricity, dust suppression, and moisture resistance. The modifying agents help to minimize or reduce the interaction of the glass fibers with water, thereby maintaining the insulative capacity of the glass wool insulation. Application of Modifying Agents to Glass Fibers The modifying agent is deposited on the surfaces of ULF glass fibers as they exit and cascade downwardly from a bushing or spinner during their manufacture. Glass fibers are typically manufactured by supplying molten glass to a fiber forming device such as a bushing or a spinner. Fibers of glass are attenuated from the device and are blown generally downwardly within a forming chamber and are deposited onto a forming conveyor. The glass fibers may then be chopped to a suitable size. Preferably the modifying agent is applied to the glass fibers as they are being formed by means of suitable spray applicators so as to result in a distribution of the modifying agent throughout a glass fiber mass. The modifying agent may be applied to the fibers as a solution or dispersion in an organic or aqueous medium. Preferably the sizing composition is applied to the fibers as an aqueous solution. The temperature of the duct is usually enough to evaporate the water before the fibers have been collected.

Chemicals that are applied to ULF compositions could be applied individually or as a mixture. In contrast, fiberglass compositions that comprise a binder are mixed prior to application. This provides an added advantage to ULF compositions as chemical compatibility (e.g., during mixing) is not an issue. In an exemplary embodiment, several chemicals are applied to the ULF composition at different processing locations in order to enhance the desired properties of the ULF glass compositions.

The ULF compositions may be further processed by air blowing to a packaging machine were they are compacted into a container, preferably a plastic bag, for shipment as a loose-fill insulation product.

Modifying Agents

The modifying agents according to the general inventive concepts are any agents which chemically interact with the glass fiber surface by: 1) bonding resulting from an attracting force, such as hydrogen bonding or Van der Waals bonding or 2) chemical bonding, such as covalent bonding.

There are numerous reactive sites on the surface of glass fibers mostly composed of units represented by the following formula (R—Si—OH) wherein R represents the remaining glass structure.

In an embodiment, the modifying agent according to the general inventive concepts operates through a chemical interaction with the hydroxyl groups located at the surface of glass fibers. The modifying agent essentially binds the hydroxyl groups and prevents chemical interactions with ambient moisture. Therefore, any agent capable of reacting with and rendering a hydroxyl group relatively unreactive may be used as the modifying agent of this invention. Most preferable modifying agents are those agents capable of undergoing a covalent bonding reaction with hydroxyl groups located at the surface of glass fibers.

In the absence of a binder, a surface modifier should interact with the glass and also protect the glass surface. Protection of the glass is achieved by covering the glass surface via hydrophobic organofunctional groups of surface modifiers (e.g., silane surface modifiers). Another way to protect the glass surface is by attaching the silanes together and forming an oligomer which is then applied to the glass surface, in both cases glass surface is partially covered by the surface modifier.

One type of modifying agent is a silane surface modifier. A silane surface modifer, as used herein is generally in the form shown below.

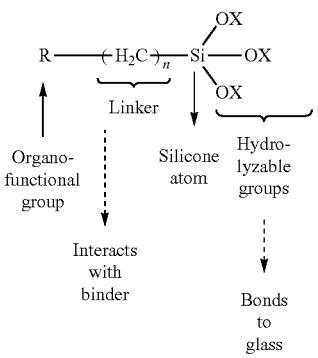

The hydrolyzable groups are usually an alkyl or functionalized alkyl moiety (e.g., X=methyl or ethyl); the embodiment shown here includes three hydrolyzable groups, those of skill in the art will recognize that silanes having fewer hydrolysable groups will fall within the general inventive concepts as well. While not wishing to be bound by theory, after hydrolysis, the hydrolyzable groups are believed to covalently react with silanol groups on the glass surface. The organofunctional group is usually selected to provide a measure of hydrophobicity or other functional property or combination thereof and may be modified to achieve such a result.

Conventionally, the silane surface modifier is provided in a alkoxy form and then hydrolyzed prior to application to the glass fiber. In certain instances, the surface modifier is diluted, for example, with water to a solid content of 1-10%, and in certain instances, about 4% solid and then hydrolyzed. This results in generation of the hydrolyzed modifier in a majority monomer form. However, it has been discovered that hydrolysis of certain silane surface modifiers at higher solid level results in increased formation of oligomers.

It has been shown that higher ratio of tetramers provides consistent insulation properties to the ULF regardless of humidity during production and/or application of the ULF products.

These oligomer modifying agents display low interaction with water. For example, a 0.043M solution of gamma-aminopropyltriethoxysilane consists of 91:9 ratio of monomer:dimer ($T^0:T^1$), while a 2.27M solution of the same silane has ~0.5:70.5 ratio of monomer:tetramer ($T^0:T^3$). In addition, in certain instances, dilution of a hydrolyzed surface modifier comprising dimers, trimers, and tetramers to a concentration of below about 5% may result in breakage of the oligomers into their constituent monomeric form. Table 1 shows the results of hydrolysis of an exemplary amino silane surface modifier (gamma-aminopropyltriethoxysilane) at a variety of concentrations.

TABLE 1

| Initial | Monomer | Dimer | Trimer | Tetramer |
|---|---|---|---|---|
| 1% (0.043M) | 91.1 | 8.9 | | |
| 2% (0.09M) | 71.6 | 28.4 | | |
| 5% (0.22M) | 21.8 | 34.4 | 37.1 | 6.7 |
| 20% (0.9M) | 7.2 | 18.1 | 40.9 | 33.9 |
| 60% (2.72M) | 0.4 | 3.2 | 25.9 | 70.5 |

The mole percent determined by $^{29}Si$ NMR.

Below is a representation of the structures resulting from hydrolysis according to the experiment of Table 1.

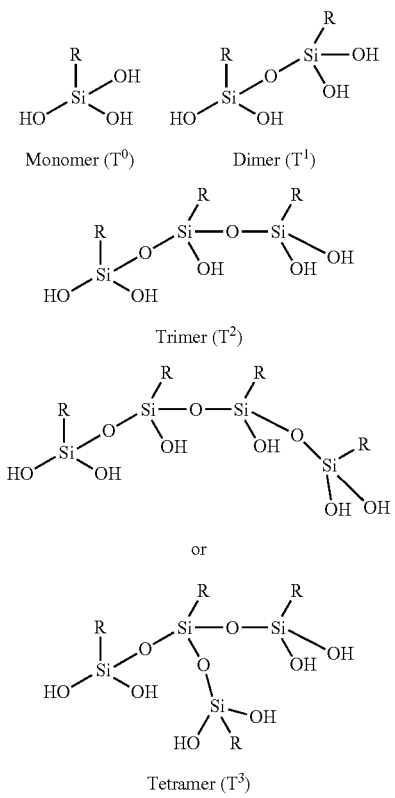

It has been shown that higher ratio of tetramers provides consistent insulation properties to the ULF regardless of humidity during production and/or application of the ULF products. Therefore, it is believed that the higher ratio of tetramers provides enhanced hydrolytic resistance to the modifying agent.

One of ordinary skill in the art would expect that a coating of monomer surface modifiers would provide a more uniform coverage, and thereby provide high water protection properties (i.e., higher hydrolytic resistance), especially when applied at equivalent Si amounts. However, it has surprisingly been found that silane surface modifiers comprising a majority of oligomers demonstrate high hydrolytic resistance.

Below is a representation of an exemplary glass surface interaction between a monomeric silane modifying agent (left) and an oligomeric silane modifying agent (right).

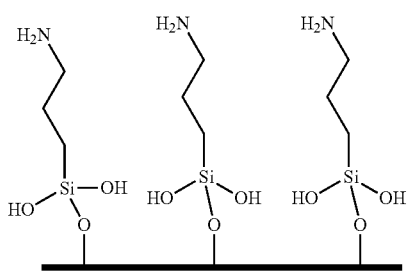

-continued

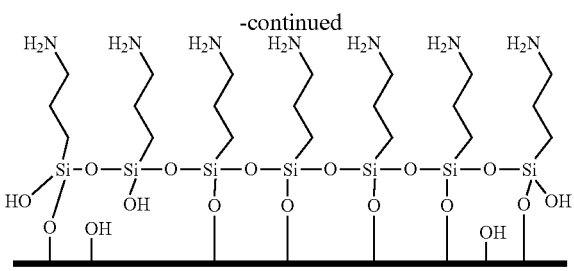

While not wishing to be bound by theory, in the scheme on the left hand side, each silane is connected to the glass by only one Si—O—Si bond. Therefore, to detach the silane from the glass, only one Si—O—Si bond needs to break. In contrast, when the surface is coated with an oligomer, the scheme on the right, more bonds must be broken by reaction with ambient water, in order to detach the modifying agent from the surface of the glass.

Therefore, in certain embodiments, the modifying agent according to the general inventive concepts is a silane modifying agent comprising less than 25% monomeric units, including less than 10%, including less than 5, and in certain embodiments, less than 1%. In certain embodiments, the modifying agent comprises greater than 50% of units consisting of dimers, trimers, and tetramers, including greater than 70%, including greater than 75%, including greater than 90%, and in certain embodiments, greater than 95%. In certain embodiments, the modifying agent comprises greater than 75% of units consisting of trimers and tetramers, including greater than 90%, and in certain embodiments, greater than 95%. In certain embodiments, the modifying agent is prepared from an aminoalkyltrialkoxysilane. In certain embodiments, the modifying agent is prepared by hydrolysis of aminopropyltriethoxysilane. In certain embodiments, the modifying agent is prepared by hydrolysis of a diamino silane.

In certain embodiments, the modifying agent is one that has been diluted and hydrolyzed at a solid level of at least 5%, including at least 10%, including at least 20%, including at least 25%, including at least 30%, including at least 35%, including at least 40%, including at least 45%, including at least 50%, including at least 55%, including at least 60%, or more. In certain exemplary embodiments, the modifying agent has been hydrolyzed at a solid level of 25% to 60%. In certain exemplary embodiments, the modifying agent has been hydrolyzed at a solid level of 30% to 60%. In certain exemplary embodiments, the modifying agent has been hydrolyzed at a solid level of 40% to 60%, including above 60% solid level. In certain exemplary embodiments, the modifying agent has been hydrolyzed at a solid level of 25% to 60%, including 26% hydrolysis, including 27% hydrolysis, including 28% hydrolysis, including 29% hydrolysis, including 30% hydrolysis, including 31% hydrolysis, including 32% hydrolysis, including 33% hydrolysis, including 34% hydrolysis, including 35% hydrolysis, including 36% hydrolysis, including 37% hydrolysis, including 38% hydrolysis, including 39% hydrolysis, including 40% hydrolysis, including 41% hydrolysis, including 42% hydrolysis, including 43% hydrolysis, including 44% hydrolysis, including 45% hydrolysis, including 46% hydrolysis, including 47% hydrolysis, including 48% hydrolysis, including 49% hydrolysis, including 50% hydrolysis, including 51% hydrolysis, including 52% hydrolysis, including 53% hydrolysis, including 54% hydrolysis, including 55% hydrolysis, including 56% hydrolysis, including 57% hydrolysis, including 57% hydrolysis, including 58% hydrolysis, including 59% hydrolysis, including 60% hydrolysis, or more. In certain embodiments, the modifying agent is prepared from an aminoalkyltrialkoxysilane. In certain embodiments, the modifying agent is prepared by hydrolysis of aminopropyltriethoxysilane. In certain embodiments, the modifying agent is prepared by hydrolysis of a diamino silane.

The general inventive concepts may comprise one or more of the following features and/or combinations thereof. A fiberglass material contains glass fibers having a modifying agent evenly distributed thereon. The modifying agent acts as a hydrophobic barrier, preventing chemical interaction between water and the surface of the glass fiber. The fiberglass material may have any suitable modifying agent content, for example, about 0.15 wt to about 0.05 wt % based on the dry weight of the glass fibers, or about 0.10 wt % to about 0.075 wt %.

Examples of modifying agents capable of undergoing a covalent bonding reaction with hydroxyl groups located at the surface of glass fibers are silanes chosen from the group consisting of alkyl silane, amino alkyl silanes (including amino alkyl silanes with more than one amino functional group).

Method of Use

In another aspect, a method for producing a fiberglass material with high hydrolytic stability is provided. The method generally involves mixing a modifying agent with glass fibers so that the modifying agent is distributed on the glass fibers. In certain embodiments, the modifying agent is prepared by hydrolysis at a high solid content (i.e., 40-60% solid). The hydrolyzed silane modifying agent is then applied to the glass fiber.

The method of making the present fiberglass material can be integrated with the manufacturing process of a loose-fill fiberglass insulation material. The process generally includes fiberizing starting glass material into glass fibers, chopping or milling the glass fibers into short pieces as chopped glass fibers, and packaging the chopped glass fibers in a bag. The process also includes applying one or more modifying agent to either the glass fibers before the chopping step or to the chopped glass fibers after the chopping step. It is also possible to add the modifying agent to the chopped glass fibers at more than one location along the manufacturing line, up to the packaging step.

In certain embodiments, the modifying agent according to the general inventive concepts is a silane modifying agent comprising less than 25% monomeric units, including less than 10%, including less than 5, and in certain embodiments, less than 1% monomeric units. In certain embodiments, the modifying agent comprises greater than 50% of units consisting of dimers, trimers, and tetramers, including greater than 70%, including greater than 75, including greater than 90%, and in certain embodiments, greater than 95% of dimers, trimers, and tetramers. In certain embodiments, the modifying agent comprises greater than 75% of units consisting of trimers and tetramers, including greater than 90%, and in certain embodiments, greater than 9:5% of trimers and tetramers. In certain embodiments, the modifying agent is prepared from an aminoalkyltrialkoxysilane. In certain embodiments, the modifying agent is prepared by hydrolysis of aminopropyltriethoxysilane. In certain embodiments, the modifying agent is prepared by hydrolysis of a diamino silane.

In certain embodiments, the modifying agent is one that has been diluted and hydrolyzed at a solid level of at least 5%, including at least 10%, including at least 20%, including at least 25%, including at least 30%, including at least 35%, including at least 40%, including at least 45%, including at least 50%, including at least 55%, including at least 60%, or more. In certain exemplary embodiments, the modifying agent has been hydrolyzed at a solid level of 25% to 60%. In certain exemplary embodiments, the modifying agent has been hydrolyzed at a solid level of 30% to 60%. In certain exemplary embodiments, the modifying agent has been hydrolyzed at a solid level of 40% to 60%, including above 60% solid level. In certain exemplary embodiments, the modifying agent has been hydrolyzed at a solid level of 25% to 60%, including 26% hydrolysis, including 27% hydrolysis, including 28% hydrolysis, including 29% hydrolysis, including 30% hydrolysis, including 31% hydrolysis, including 32% hydrolysis, including 33% hydrolysis, including 34% hydrolysis, including 35% hydrolysis, including 36% hydrolysis, including 37% hydrolysis, including 38% hydrolysis, including 39% hydrolysis, including 40% hydrolysis, including 41% hydrolysis, including 42% hydrolysis, including 43% hydrolysis, including 44% hydrolysis, including 45% hydrolysis, including 46% hydrolysis, including 47% hydrolysis, including 48% hydrolysis, including 49% hydrolysis, including 50% hydrolysis, including 51% hydrolysis, including 52% hydrolysis, including 53% hydrolysis, including 54% hydrolysis, including 55% hydrolysis, including 56% hydrolysis, including 57% hydrolysis, including 57% hydrolysis, including 58% hydrolysis, including 59% hydrolysis, including 60% hydrolysis, or more. In certain embodiments, the modifying agent is prepared from an aminoalkyltrialkoxysilane. In certain embodiments, the modifying agent is prepared by hydrolysis of aminopropyltriethoxysilane. In certain embodiments, the modifying agent is prepared by hydrolysis of a diamino silane.

It is to be understood that other substances including a de-dusting oil, a lubricant, or a dye may also be applied to the glass fibers together with the a modifying agent.

Depending on the form of the glass fibers, a variety of fiberglass products may be made from the present fiberglass material. The glass fibers may be discontinuous fibers which are short pieces of fibers used as baits, blankets or boards for insulation or infiltration. The discontinuous glass fibers may be formed into wool like material that is thick and fluffy suitable for use for thermal insulation and sound absorption. In certain embodiments, the discontinuous glass fiber is used to form a loose-fill fiberglass material that is commonly used for home insulation.

The glass fibers may be made of any suitable raw materials. For example, the glass fibers may be produced from a variety of natural minerals or manufactured chemicals such as silica sand, limestone, and soda ash. Other ingredients may include calcined alumina, borax, feldspar, nepheline syenite, magnesite, and kaolin clay. The method of forming fibers (fiberization) from the raw glass material is generally known in the art. The fibers once formed, may be pulverized, cut, chopped or broken into suitable lengths for various applications. Several devices and methods are available to produce short pieces of fibers and are known in the art.

All percentages, parts and ratios as used herein, are by weight of the total composition, unless otherwise specified. All such weights as they pertain to listed ingredients are based on the active level and, therefore, do not include solvents or by-products that may be included in commercially available materials, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more (e.g., 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

The fiberglass compositions, and corresponding manufacturing methods of the present disclosure can comprise, consist of, or consist essentially of the essential elements and limitations of the disclosure as described herein, as well as any additional or optional ingredients, components, or limitations described herein or otherwise useful in fiberglass composition applications.

The fiberglass compositions of the present disclosure may also be substantially free of any optional or selected essential ingredient or feature described herein, provided that the remaining fiberglass composition still contains all of the required ingredients or features as described herein. In this context, and unless otherwise specified, the term "substantially free" means that the selected composition contains less than a functional amount of the optional ingredient, typically less than 0.1% by weight, and also including zero percent by weight of such optional or selected essential ingredient.

To the extent that the terms "include," "includes," or "including" are used in the specification or the claims, they are intended to be inclusive in a manner similar to the term "comprising" as that term is interpreted when employed as a transitional word in a claim. Furthermore, to the extent that the term "or" is employed (e.g., A or B), it is intended to mean "A or B or both A and B." When the applicants intend to indicate "only A or B but not both," then the term "only A or B but not both" will be employed. Thus, use of the term "or" herein is the inclusive, and not the exclusive use. In the present disclosure, the words "a" or "an" are to be taken to include both the singular and the plural. Conversely, any reference to plural items shall, where appropriate, include the singular.

In some embodiments, it may be possible to utilize the various inventive concepts in combination with one another. Additionally, any particular element recited as relating to a particularly disclosed embodiment should be interpreted as available for use with all disclosed embodiments, unless incorporation of the particular element would be contradictory to the express terms of the embodiment. Additional advantages and modifications will be readily apparent to those skilled in the art. Therefore, the disclosure, in its broader aspects, is not limited to the specific details presented therein, the representative apparatus, or the illustrative examples shown and described. Accordingly, departures may be made from such details without departing from the spirit or scope of the general inventive concepts.

While the invention has been illustrated and described in detail in the drawings and foregoing description, the same is to be considered as illustrative and not restrictive in character. It should be understood that only the exemplary embodiments have been shown and described and that all changes and modifications that come within the spirit of the invention are desired to be protected.

What is claimed is:

1. A pourable or blowable loose-fill insulation product comprising:
   a) glass fiber insulation wool, said glass fiber insulation wool comprising a plurality of glass fibers each having hydroxyl groups on the surface thereof;
   b) an aminoalkyl silane modifying agent comprising free hydroxyl groups which chemically interact with said hydroxyl groups on the surface of the glass fibers which promotes hydrolytic resistance in said glass fiber insulation wool; and
   wherein said modifying agent comprises less than 25% monomeric units; and
   wherein the modifying agent comprises greater than 50% of units consisting of dimers, trimers, and tetramers;
   wherein the dimers, trimers, and tetramers are selected from the group comprising the following structures:

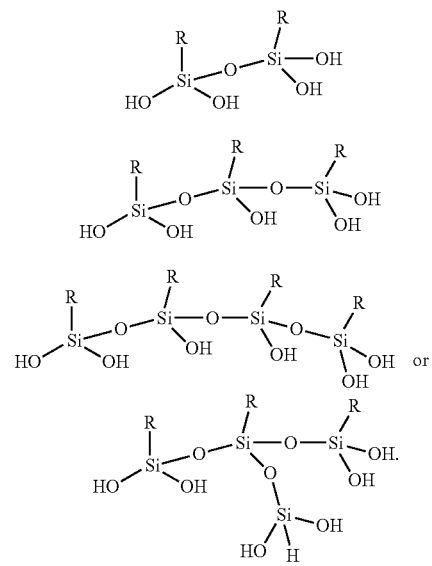

2. The product of claim 1, wherein the modifying agent comprises less than 10% monomeric units.

3. The product of claim 1, wherein the modifying agent comprises less than 5% monomeric units.

4. The product of claim 1, wherein the modifying agent comprises less than 1% monomeric units.

5. The product of claim 1, wherein the modifying agent comprises greater than 90% of units consisting of dimers, trimers, and tetramers.

6. The product of claim 5, wherein the silane modifying agent is hydrolyzed at a solid level of at least 5%.

7. The product of claim 5, wherein the silane modifying agent is hydrolyzed at a solid level of 25% to 60%.

8. A method for the production of an unbonded loose-fill insulation comprising:
   diluting a silane modifying agent;
   hydrolyzing the silane modifying agent to provide a hydrolyzed silane modifying agent comprising free hydroxyl groups; and
   mixing the hydrolyzed silane modifying agent with glass fibers so that the modifying agent is distributed on the glass fibers;
   wherein the free hydroxyl groups of the hydrolyzed silane modifying agent chemically interact with hydroxyl groups on the surface of the glass fibers which promotes hydrolytic resistance in the insulation;
   wherein the hydrolyzed silane modifying agent is an aminoalkyl silane; and
   wherein the hydrolyzed silane modifying agent comprises greater than 50% of units consisting of dimers, trimers, and tetramers selected from the group comprising the following structures:

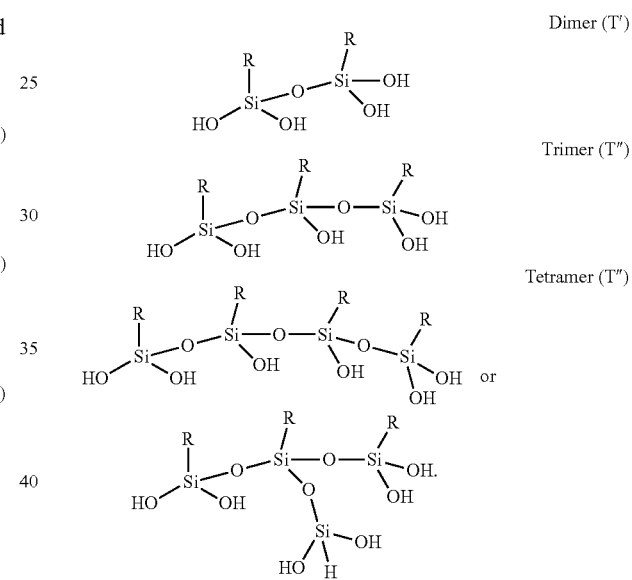

9. The method of claim 8, wherein the silane modifying agent is diluted to a solid level of at least 5%.

10. The method of claim 8, wherein the silane modifying agent is diluted to a solid level of 25% to 60%.

11. The method of claim 8, wherein the hydrolyzed silane modifying agent comprises less than 25% monomeric units.

12. The method of claim 8, wherein the hydrolyzed silane modifying agent comprises less than 10% monomeric units.

13. The method of claim 8, wherein the hydrolyzed silane modifying agent comprises less than 1% monomeric units.

14. The method of claim 8, wherein the hydrolyzed silane modifying agent comprises greater than 90% of units consisting of dimers, trimers, and tetramers after hydrolysis.

15. The method of claim 8, wherein the hydrolyzed silane modifying agent is diluted after hydrolysis but before mixing with the glass fibers.

* * * * *